United States Patent
Thippeswamy et al.

(10) Patent No.: US 7,602,716 B1
(45) Date of Patent: Oct. 13, 2009

(54) LOAD SHARING ON DOCSIS

(75) Inventors: Arunkumar B. Thippeswamy, Cupertino, CA (US); Kushal A. Patel, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1645 days.

(21) Appl. No.: 10/028,069

(22) Filed: Dec. 20, 2001

(51) Int. Cl.
*G01R 31/08* (2006.01)
(52) U.S. Cl. ........................................ 370/235; 370/465
(58) Field of Classification Search ................. 370/230, 370/232, 233, 234, 235, 252, 395.21, 395.41, 370/395.42, 465, 468
See application file for complete search history.

(56) References Cited

U.S. PATENT DOCUMENTS

| | | | | |
|---|---|---|---|---|
| 6,002,691 | A * | 12/1999 | Citta et al. ................. | 370/447 |
| 6,104,700 | A * | 8/2000 | Haddock et al. ............. | 370/235 |
| 6,141,759 | A | 10/2000 | Braddy ....................... | 713/201 |
| 6,157,614 | A | 12/2000 | Pasternak et al. ............ | 370/236 |
| 6,223,222 | B1 * | 4/2001 | Fijolek et al. ............... | 709/227 |
| 6,292,651 | B1 | 9/2001 | Dapper et al. ................ | 455/5.1 |
| 6,331,987 | B1 | 12/2001 | Beser ......................... | 370/486 |
| 6,442,158 | B1 | 8/2002 | Beser ......................... | 370/352 |
| 6,442,603 | B1 | 8/2002 | Borella ....................... | 709/218 |
| 6,449,647 | B1 | 9/2002 | Colby et al. ................. | 709/226 |
| 6,515,963 | B1 * | 2/2003 | Bechtolsheim et al. ...... | 370/229 |
| 6,636,482 | B2 * | 10/2003 | Cloonan et al. .............. | 370/230 |
| 6,636,485 | B1 * | 10/2003 | Fijolek et al. ............... | 370/252 |
| 6,889,385 | B1 * | 5/2005 | Rakib et al. ................. | 725/119 |
| 6,937,561 | B2 * | 8/2005 | Chiussi et al. ............... | 370/229 |
| 6,950,399 | B1 * | 9/2005 | Bushmitch et al. .......... | 370/236 |
| 6,963,931 | B2 * | 11/2005 | Bunn et al. .................. | 709/246 |
| 7,002,914 | B2 * | 2/2006 | Cloonan ...................... | 370/232 |
| 7,012,891 | B1 * | 3/2006 | Chandran et al. ............ | 370/230 |
| 7,039,048 | B1 * | 5/2006 | Monta et al. ................. | 370/389 |
| 7,079,547 | B2 * | 7/2006 | Lu et al. ...................... | 370/463 |
| 7,080,400 | B1 * | 7/2006 | Navar ......................... | 725/139 |
| 7,092,397 | B1 * | 8/2006 | Chandran et al. ......... | 370/395.5 |
| 7,177,324 | B1 * | 2/2007 | Choudhury et al. ......... | 370/468 |
| 7,242,694 | B2 * | 7/2007 | Beser .......................... | 370/449 |
| 7,349,430 | B1 * | 3/2008 | Chapman ..................... | 370/468 |
| 2002/0057699 | A1 * | 5/2002 | Roberts ................. | 370/395.32 |
| 2002/0065907 | A1 * | 5/2002 | Cloonan et al. .............. | 709/223 |
| 2002/0105965 | A1 * | 8/2002 | Dravida et al. .............. | 370/463 |
| 2002/0136200 | A1 * | 9/2002 | St. John ...................... | 370/352 |
| 2002/0196737 | A1 * | 12/2002 | Bullard ........................ | 370/231 |
| 2003/0016692 | A1 * | 1/2003 | Thomas et al. ............... | 370/442 |
| 2003/0058889 | A1 * | 3/2003 | Lansing et al. ............... | 370/471 |
| 2003/0067944 | A1 * | 4/2003 | Sala et al. .................... | 370/474 |
| 2003/0078964 | A1 * | 4/2003 | Parrella et al. ............... | 709/203 |
| 2003/0081626 | A1 * | 5/2003 | Naor et al. ................... | 370/431 |
| 2003/0110250 | A1 * | 6/2003 | Schnitzer et al. ............ | 709/224 |

* cited by examiner

*Primary Examiner*—Phirin Sam
(74) *Attorney, Agent, or Firm*—Edell, Shapiro & Finnan, LLC

(57) ABSTRACT

Methods and apparatus for efficiently distributing traffic on available best-effort service flows within a system are disclosed. According to one aspect of the present invention, a method for forwarding a packet which includes destination information and source information upstream from a source to a destination includes determining a first value associated with the packet using the destination information and the source information. A first service flow that is suitable for use to forward the packet is identified using the first value. The first service flow is one of a set of service flows between a source and a central access point. Once the first service flow is identified, the packet is sent on the first service flow. In one embodiment, the source is a subscriber unit and the central access point is a headend.

30 Claims, 7 Drawing Sheets

| TOTAL NUMBER OF SERVICE FLOWS | \multicolumn{16}{c}{HASH BUCKET VALUE} | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 1 | 1 | 1 | 1 | 1 | 1 | 1 | 1 | 1 | 1 | 1 | 1 | 1 | 1 | 1 | 1 | 1 |
| 2 | 1 | 2 | 1 | 2 | 1 | 2 | 1 | 2 | 1 | 2 | 1 | 2 | 1 | 2 | 1 | 2 |
| 3 | 1 | 3 | 3 | 1 | 2 | 3 | 1 | 2 | 3 | 1 | 2 | 3 | 1 | 2 | 3 | 1 |
| 4 | 1 | 2 | 3 | 4 | 1 | 2 | 3 | 4 | 1 | 2 | 3 | 4 | 1 | 2 | 3 | 4 |
| 5 | 1 | 2 | 3 | 4 | 5 | 1 | 2 | 3 | 4 | 5 | 1 | 2 | 3 | 4 | 5 | 1 |
| 6 | 1 | 2 | 3 | 4 | 5 | 6 | 1 | 2 | 3 | 4 | 5 | 6 | 1 | 2 | 3 | 4 |

Fig. 10

LOAD SHARING ON DOCSIS

BACKGROUND OF THE INVENTION

1. Field of Invention

The present invention relates generally to data communication systems. More particularly, the present invention relates to systems and methods for efficiently allocating bandwidth on service flows.

2. Description of the Related Art

The demand for data communication services is growing at an explosive rate. Much of the increased demand is due to the fact that as the use of computing devices becomes more prevalent, the need for creating networks of computing devices such that resources may be shared between the computing devices also increases. To this end, cable networks which include cable modems enable users or subscribers to share resources on the cable network. Cable operators are deploying high-speed packet-based communications systems on cable television systems that are capable of supporting a wide variety of services. Services that may be provided by cable operators using cable television systems include, but are not limited to, packet telephony services, video conferencing services, and frame relay services. Such services generally make use of a Data Over Cable Service Interface Specifications (DOCSIS) protocol.

The DOCSIS protocol allows for transparent, bi-directional transfer of Internet Protocol (IP) traffic between cable system headend and customer locations. The IP traffic is transmitted over coaxial cables or hybrid-fiber/coaxial (HFC) cables. FIG. 1a is a diagrammatic representation of a wired cable system which uses DOCSIS. A cable system 100 includes a cable mode terminating system (CMTS) 104, which is located at a headend, i.e., a service provider location. Cable system 100 also includes cable modems (CMs) 108, which are typically located at customer locations. Often, CMs 108 are in communication with computer systems, e.g., CM 108b is linked to a local area network (LAN) 116 and CM 108c is linked to a computer 112. A cable line 106 is a transmission path which enables IP traffic to be transferred between CMTS 104 and CMs 108. Typically, only one CM 108 may transmit data on cable line 106 at any given time.

While cable system 100 may be implemented by cable operators, Internet Service Providers (ISPs) or Competitive Access Service Providers (CAPs), a similar system may be implemented with respect to wireless systems. FIG. 1b is a diagrammatic representation of a wireless transmissions system which uses DOCSIS. A system 120 includes a headend 124, or hub, which is effectively connected to subscriber units 128. Headend 124 is substantially analogous to CMTS 104 of FIG. 1a and serves as a central access point, while subscriber units 128 are substantially analogous to CMs 108 of FIG. 1a. Radio Frequency (RF) link 126 is analogous to cable line 106, except that link 126 is unwired while cable line 106 is wired.

Often, when a subscriber unit or a cable modem attempts to transmit information upstream, i.e., to a headend such as a CMTS or a headend in a wireless system, the subscriber unit or cable modem may request bandwidth from the headend of the CMTS. The request may be made by sending the request using frames, which are associated with a link, that are effectively set aside for bandwidth requests. Herein and after, for ease of discussion, the transmission of information upstream will be described in terms of a headend and a subscriber unit. It should be appreciated, however, that a CMTS is substantially analogous to a headend, and a cable modem is substantially analogous to a subscriber unit.

When a subscriber unit requests bandwidth for the transmission of data, the associated headend may schedule and allocate a time for the subscriber unit to transfer data. FIG. 2 is a diagrammatic representation of the steps associated with transmitting a packet upstream from a subscriber unit. A subscriber unit 208 sends a bandwidth request to a headend 204 when subscriber unit 208 wishes to transmit a packet to headend 204. After headend 204 receives bandwidth request 220, headend 204 allocates a time for subscriber unit 208 to transmit the packet on a service flow, and sends information 222 relating to the time scheduled for transmitting the packet to subscriber unit 208. When the scheduled time arrives, i.e., when the bandwidth allocated to subscriber unit 208 is available, a packet transmission 224 occurs in which subscriber unit 208 transmits the packet to headend 204. A logic block 230 associated with subscriber unit 208 may effectively execute code which monitors when the scheduled time arrives.

In a best-effort traffic delivery system as described with respect to FIG. 2, each time subscriber unit 208 wishes to transmit a packet, subscriber unit 208 must request bandwidth allotment, regardless of whether the packet to be transmitted is concatenated or non-concatenated. Typically, the amount of time required for the bandwidth request to be transmitted and for subsequent transmission of the packet after receiving the allocation information, i.e., a round trip time, is between approximately ten milliseconds (ms) to approximately fifteen ms. With respect to FIG. 2, the time elapsed from bandwidth request 220 until packet transmission 224 constitutes the round trip time. When the round trip time is approximately ten ms, subscriber unit 208 may make a maximum of approximately 100 requests for bandwidth per second. Hence, subscriber unit 208 may send a maximum of approximately 100 packets to headend 204 each second. When the packets sent by subscriber unit 208 are concatenated, the packets are typically approximately 2000 bytes or 16,000 bits in length. As such, when only up to 100 packets may be transmitted every second, on a given service flow or identifier, a data transfer rate of approximately 1.6 Megabits per second (Mbps) is substantially the highest achievable data transfer rate.

While a 1.6 Mbps data transfer rate may be acceptable in some situations, e.g., when target subscribers or customers are small offices or home offices, bandwidth requirements are generally increasing such that a 1.6 Mbps data transfer rate may be unacceptable. In particular, many small and medium sized businesses are demanding upstream data transfer rates of up to six Mbps.

As will be appreciated by those skilled in the art, all packets that are to be transmitted upstream are transmitted on a service flow, as described in the DOCSIS 1.1 Specification by Cable Television Laboratories, Inc., which is incorporated herein by reference in its entirety. A service flow defines a transport service that is characterized by a set of quality-of-service parameters such as latency, jitter, and throughput assurances. In general, a service flow identifier defines a particular unidirectional mapping between a subscriber unit and a headend unit. The headend unit may assign one or more service flow identifiers (SFIDs) to each subscriber unit to correspond to service flows required by the subscriber unit.

To increase a data transfer rate, a headend may assign multiple service flow identifiers to a subscriber unit for the transmission of upstream service. In general, depending upon how a subscriber unit is configured, there may be between four and sixteen service flows between the subscriber unit and an associated headend. Each of the service flows may be used to offer best-effort IP service. The use of multiple service flows may alleviate bottlenecks associated with the best-effort type traffic delivery described above with respect to FIG. 2. The multiple service flows enable traffic to be divided among various service flows.

Typically, when there is more than one service flow available to a subscriber unit, the transmission of packets over the multiple service flows may be determined such that the load on the service flows may be distributed. In other words, transmission of packets may be allocated in an effort to allow the service flows to be used evenly. FIG. 3 is a diagrammatic representation of service flows between a subscriber unit and a headend. A subscriber unit 308, as shown, may be configured to have four service flows 311 over which packets may be transferred to a headend 304. DOCSIS requires that classifiers, or rules, be defined in order to map a packet to a particular service flow 311. In other words, classifiers or rules may be used to determine an appropriate service flow 311 to use to transmit a packet. Classifiers may include, but are not limited to, IP classification encodings such as a masked source IP address, a masked destination IP addresses, a protocol, a source port range, and a destination port range.

FIG. 4 is a diagrammatic representation of packets and service flows over which the packets are to be transmitted. Packets 406 that are to be transmitted by a subscriber unit to a headend unit are generally passed though a set of classifiers such that packets 406 may be matched with appropriate service flows 411. Service flows 411b-d may be quality-of-service service flows that are each expected to be used for particular types of traffic, e.g., particular service flows 411 may be reserved for video traffic or for voice traffic. If a packet 406 is consistent with either a first classifier or a second classifier, for instance, that packet 406 may be transmitted on service flow 411b. Alternatively, if a packet 406 is consistent with either a third classifier or a fourth classifier, then that packet 406 may be transmitted on service flow 411c.

With reference to FIG. 5, the steps associated with transmitting a packet through service flows that are associated with classifiers will be described. A process 500 of transmitting a packet begins at step 502 in which a packet that is to be transmitted from a subscriber unit to a headend unit is passed through a set of known classifiers. That is, a packet is effectively compared against a set of classifiers identified by a network administrator. Once the packet is passed through the set of known classifiers, a determination is made in step 504 regarding whether the packet matches, or is otherwise associated with, a known classifier. If it is determined that the packet matches the known classifier, then process flow proceeds to step 506 in which the packet is sent on the service flow that is assigned to the classifier associated with the packet. After the packet is sent, the process of transmitting the packet is completed.

Alternatively, if it is determined in step 504 that the packet does not match a known classifier, then the packet is sent or transmitted on a primary service flow. In other words, referring back to FIG. 4, if a packet 406 is not consistent with any known classifier, that packet 406 is transmitted over a best-effort or primary service flow 411a. Once the packet is transmitted on a primary service flow, the process of transmitting the packet is completed.

In order to determine a set of classifiers, and to associate the classifiers with particular service flows, a network administrator generally must study the traffic pattern between a subscriber unit and a headend. Generally, if the traffic pattern changes, the network administrator may either have to reassociate the classifiers with different service flows, or to add new classifiers. That is, the network administrator may have to configure or reconfigure classifiers. Configuring and reconfiguring classifiers is generally time consuming. Further, it has been observed that the performance of a subscriber unit is inversely proportional to the number of classifiers associated with the subscriber unit. Hence, the more classifiers that are identified to prevent a relatively large number of packets such as packets 406 of FIG. 4 from being transferred over service flow 411a, the lower the performance of the associated subscriber unit.

Additionally, bandwidth associated with service flows may not be used efficiently when packets associated with certain classifiers are transmitted more often than other classifiers. For example, if packets of one classifier are repeatedly transmitted while packets associated with other classifiers are rarely transmitted, one service flow will generally be constantly used while the bandwidth associated with other service flows may be essentially wasted. That is, if packets are consistently a part of the same session, i.e., have the same source and destination IP addresses, then the service flow that is appropriate for that session may be constantly used while other service flows remain relatively unused.

Therefore, what is needed is an efficient method for allowing packets to be transmitted between subscriber units and a headend. That is, what is desired is a method for efficiently using the bandwidth associated with multiple service flows when transmitting packets on the service flows.

SUMMARY OF THE INVENTION

The present invention relates to efficiently distributing traffic on available best-effort service flows within a system. According to one aspect of the present invention, a method for forwarding a packet which includes destination information and source information upstream from a source to a central access point includes determining a first value associated with the packet using the destination information and the source information. A first service flow that is suitable for use to forward the packet is identified using the first value. The first service flow is one of a set of service flows between the source and the central access point. Once the first service flow is identified, the packet is sent on the first service flow. In one embodiment, the source is a subscriber unit and the central access point is a headend.

In another embodiment, determining the first value associated with the packet includes applying a hash function to the destination information and the source information, and generating the first value using the hash function. In such an embodiment, the first value is associated substantially only with the first service flow, and substantially any packet which is associated with the first value is sent through the first service flow.

Efficiently enabling load sharing to occur with respect to a Data Over Cable Service Interface Specifications (DOCSIS) protocol in both cable systems and wireless systems allows a subscriber unit to make use of substantially all available service flows. As such, the overall performance of the cable system or the wireless system in which traffic is distributed efficiently over substantially all available service flows may be improved.

According to another aspect of the present invention, a method for forwarding packets upstream from a source to a central access point includes identifying a number (N) of available service flows between the source and the central access point, sending a first packet from the source to the central access point on a first service flow, and sending an Nth packet from the source to the central access point on an Nth service flow. In one embodiment, the method also includes sending an (N−1)th packet from the source to the central access point on an (N−1)th service flow, as well as sending a second packet from the source to the central access point on a second service flow included in the N available service flows. That is, packets may be sent between a source and a central access point over available service flows on a substantially round robin basis.

According to still another aspect of the present invention, a device for forwarding packets to a central access point includes a routing component, a hashing component, and a first service flow identifier. The hashing component applies a hash function to information associated with a first packet to determine a value, while the routing component provides the information associated with the first packet to the hashing component. The first service flow identifier is associated with the value, and the hashing component provides the packet to the first service flow identifier. In one embodiment, the device is either a subscriber unit or a cable modem These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 10 is a table which indicates the associations between service flows and hash bucket values in accordance with an embodiment of the present invention.

DETAILED DESCRIPTION OF THE EMBODIMENTS

Enabling efficient load sharing with respect to a Data Over Cable Service Interface Specifications (DOCSIS) protocol in both cable systems and wireless systems allows a subscriber unit within a system to make use of substantially all available service flows within the system such that the available service flows may be used relatively evenly. When load sharing occurs without the need to configure classifiers, the overall performance of the system which uses the load sharing may not be compromised. Further, using load sharing, packets associated with a session may pass through substantially only a single service flow.

A per-packet load sharing method and a per-session load sharing method may each be suitable for efficiently allowing a load to be shared among various available service flows. A per-packet load sharing method enables all packets associated with a session to be transmitted through substantially all available service flows, which enables the time associated with transmitting the packets associated with the session to be substantially reduced. A per-session load sharing method enables the order of packets within a session to be maintained, while allowing the load to be shared among substantially all available service flows.

The allocation of traffic over multiple service flows in cable and wireless systems which use the DOCSIS protocol, without the need to configure classifiers, allows traffic to be transmitted upstream between a subscriber unit and a headend efficiently. As such, since each service flow may support approximately 1.6 MegaBytes (Mb), the use of multiple service flows enables the upstream bandwidth for transmitting packets to increase by approximately 1.6 Mb for each available service flow, without incurring performance penalties associated with configuring classifiers.

Figure 1A:
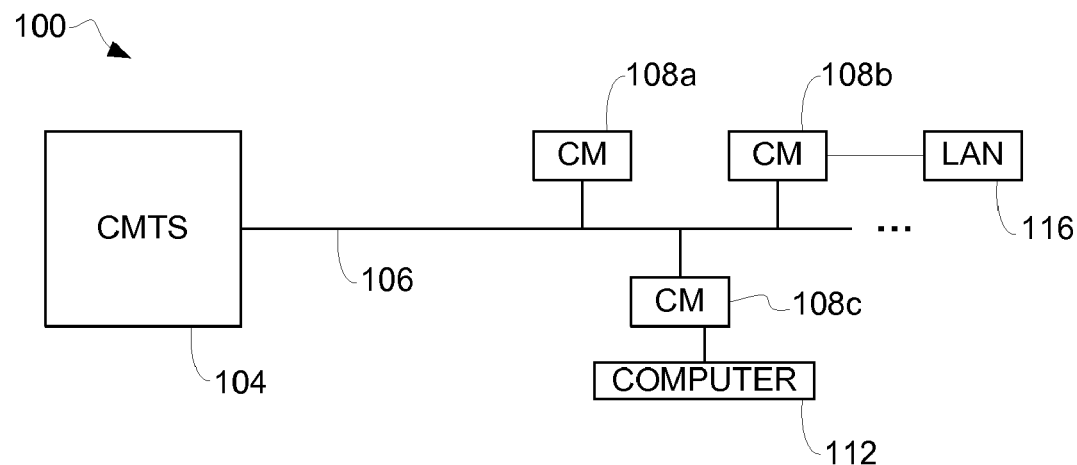
FIG. 1a is a diagrammatic representation of a wired cable system which uses DOCSIS.
Figure 1B:
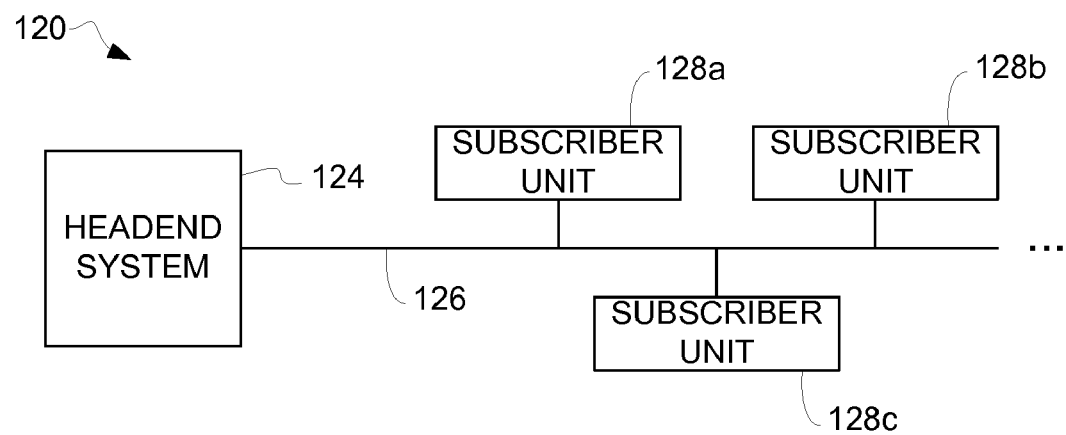
FIG. 1b is a diagrammatic representation of a wireless transmissions system which uses DOCSIS.
Figure 2:
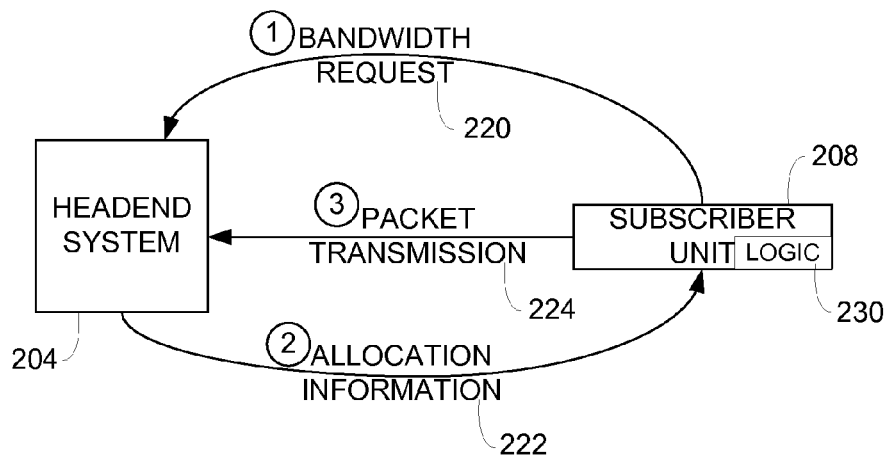
FIG. 2 is a diagrammatic representation of the steps associated with transmitting a packet upstream from a subscriber unit.
Figure 3:
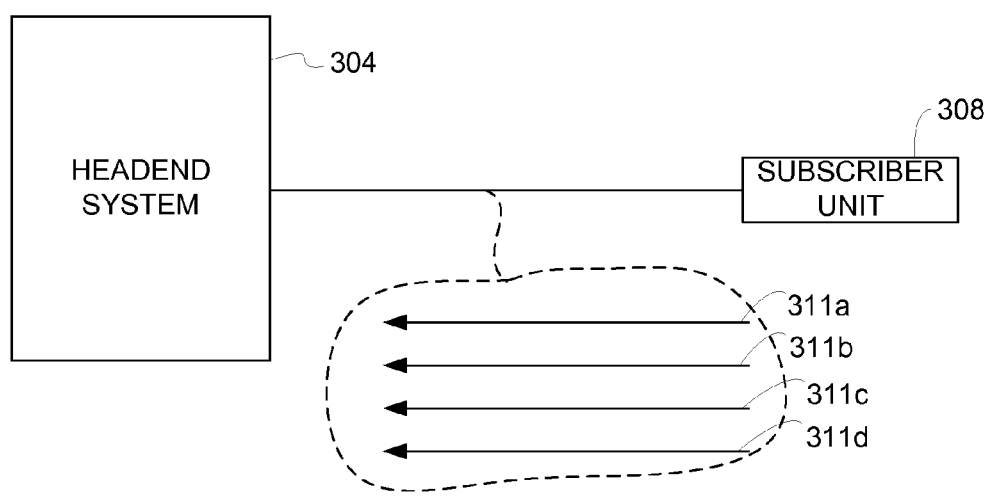
FIG. 3 is a diagrammatic representation of service flows between a subscriber unit and a headend.
Figure 4:
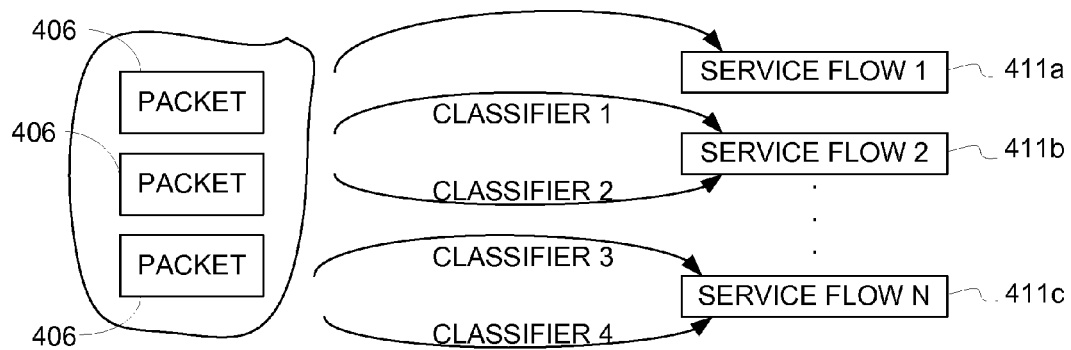
FIG. 4 is a diagrammatic representation of packets and service flows over which the packets are to be transmitted.
Figure 5:
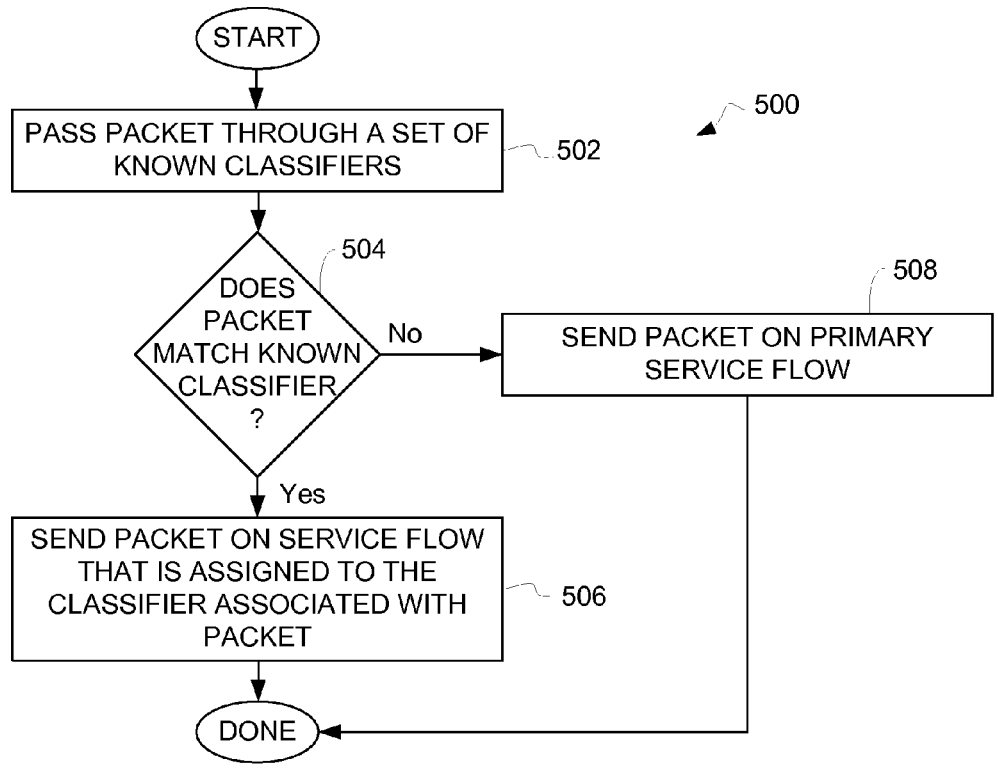
FIG. 5 is a process flow diagram which illustrates the steps associated with transmitting a packet through service flows that are associated with classifiers.
Figure 6:
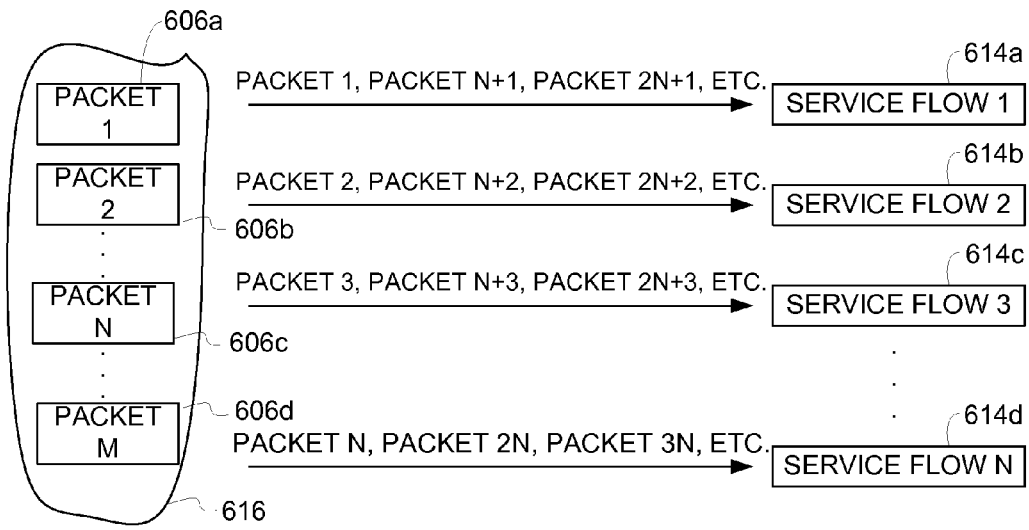
FIG. 6 is a diagrammatic representation of packets and service flows over which the packets are to be transmitted in accordance with an embodiment of the present invention.

One method which may be used to efficiently enable the load to be shared between multiple service flows without requiring that classifiers be configured is a per-packet load sharing method, as mentioned above. A per-packet load sharing method generally enables the load to be shared substantially equally between available service flows. FIG. 6 is a diagrammatic representation of packets and service flows over which the packets are to be transmitted in accordance with an embodiment of the present invention. In the described embodiment, an upstream transmissions path between a subscriber unit or a cable modem, which may be coupled to a device such as a computing system, a telephone, or a facsimile machine, and a headend unit includes "N" service flows 614. While the number of service flows 614 may vary, the number of service flows 614 is typically in the range of approximately four to approximately sixteen service flows. For ease of discussion, the present invention will generally be described in terms of a subscriber unit and a headend. Such a subscriber unit and headend, or central access point, may be associated with a wireless point to multi-point system. It should be appreciated, however, that in one embodiment, the subscriber unit may be a cable modem and the headend may be a cable modem terminating system (CMTS) that are both part of a wired system.

Packets 606, which may be received by a routing component 616 of a subscriber unit, are transmitted in a substantially round-robin manner such that substantially no service flow 614 receives and transmits a packet 606 before all other service flows 614 have received and transmitted a packet. In other words, packets 606 are transmitted such that a first packet 606a is transmitted using a first service flow 614a, and a second packet 606b which follows first packet 606a in sequence is transmitted using a second service flow 614b. An "Nth" packet 606c in the sequence of packets 606 may then be transmitted using an "Nth" service flow 614d. Once Nth packet 606c is transmitted using Nth service flow 614d, the next packet to be transmitted may be transmitted on first service flow 614a. That is, a packet "N+1" (not shown) may be transmitted on first service flow 614a. Similarly, a packet "N+2" (not shown) may be transmitted on second service flow 614b. In general, Nth service flow 614d may be used to transmit packets "L*N" (not shown), where L is substantially any positive integer value, while first service flow 614a may be used to transmit packets "L*N+1" (not shown), and second service flow 614b may be used to transmit packets "L*N+2" (not shown).

Transmitting packets 606 in a round-robin manner such that no service flow 614 is reused until all other service flows 614 have been used enables traffic to be split substantially evenly between available service flows 614. However, packets 606 within a particular session, or packets 606 which have the same source and destination IP addresses, may be delivered out of sequence to a headend, e.g., second packet 606b may arrive at the headend before first packet 606a. The out of sequence delivery may occur when, for example, the subscriber unit prioritizes certain service flows 614. When packets 606 are received on a headend out of sequence, latency may occur. Specifically, delays associated with awaiting the arrival of out of sequence packets, in addition to the time associated with reordering the out of sequence packets, may adversely affect the performance of the overall system. As a result, per-packet load sharing may be particularly suitable for use in systems in which packet sequence is relatively unimportant and latency is substantially not an issue.

When it is relatively important for packets to arrive at a headend in sequence, and latency may be an issue, a per-session load sharing method may be used to allocate bandwidth on multiple active service flows. In a per-session load sharing method, packets within a session, or packets which have the same source and destination IP addresses, are assigned to a particular service flow. As such, packets within a session are delivered in sequence, thereby maintaining the latency of each packet.

Figure 7:
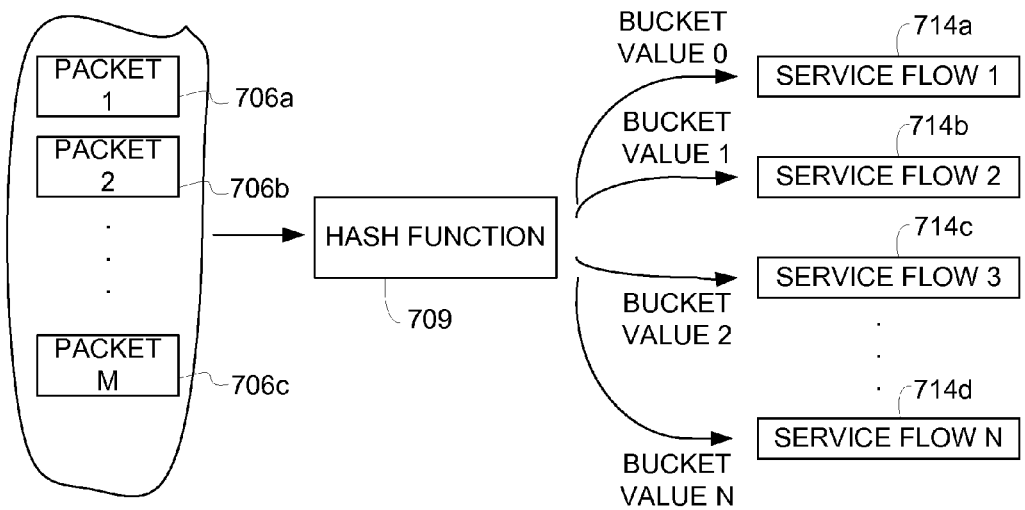
FIG. 7 is a diagrammatic representation of packets and service flows over which the packets are to be transmitted in accordance with another embodiment of the present invention.

Assigning a particular session to an appropriate active service flow may include using a hash function on information associated with packets. FIG. 7 is a diagrammatic representation of packets and service flows over which the packets are to be transmitted in accordance with another embodiment of the present invention. Packets 706 are processed by a hash function 709 to determine hash values for packets 706. In general, the number of potential hash values that may be determined or assigned by hash function 709 is "N." Typically, "N" may be chosen to be greater than or equal to the number of service flows 714 that are available. In the described embodiment, "N" may be substantially any value that is less than or equal to sixteen.

Hash bucket values that are generated by hash function 709 may effectively be mapped to service flows 714. Each service flow 714 is assigned to a hash bucket, as shown, and hash values generated by hash function 709 are used to select appropriate service flows 714. For example, if hash function 709 determines that first packet 706a has a hash bucket value of zero, first packet 706a may be transmitted on service flow 714a. Alternatively, if hash function 709 determines that second packet 706b has a hash bucket value of two, second packet 706b may be transmitted on service flow 714c. In the described embodiment, each service flow 714 has substantially only associated bucket value. Typically, the number of hash buckets in a system is greater than or equal to the number of service flows or ports that are available. Using fewer hash buckets than the number of service flows may be inefficient, as substantially only the service flows equal to the number of hash buckets would be used for load sharing, while the remaining service flows would effectively not be used. As such, in order to increase efficiency, the number of hash buckets is generally at least equal to the number of service flows. Hence, in some embodiments in which the number of hash buckets is greater than the number of service flows, more than one hash bucket may be assigned to a given service flow 714.

Hash function 709 may be applied to substantially any suitable information associated with a packet 706 that enables a hash bucket value to be determined. By way of example, hash function 709 may take a source IP address and a destination IP address of a packet 706 as input. That is, the source IP address and the destination IP address of a packet 706 may be hashed to identify which service flow 714 should be used to allow the transmission of the packet 706. The source IP address and the destination IP address of a packet 706 may be included in a header of a packet 706.

Figure 8:
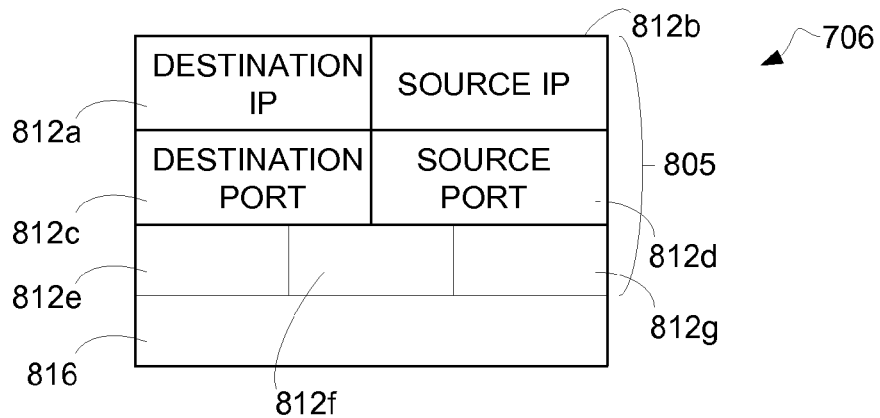
FIG. 8 is a diagrammatic representation of a packet, e.g., packet 706 of FIG. 7, in accordance with an embodiment of the present invention.

FIG. 8 is a diagrammatic representation of a packet, e.g., packet 706 of FIG. 7, in accordance with an embodiment of the present invention. Packet 706, which is an IP packet includes a header 805. Typically, header 805 includes twenty bytes of data that are divided into fields 812. Fields 812 generally include a destination IP address field 812a, which contains the IP address of the destination of the packet, and a source IP address field 812b, which contains the IP address of the sender or source of the packet, e.g., a computer system that is associated with a subscriber unit. The contents of destination IP address field 812a and the contents of source IP address field 812b may be provided to a hash function, e.g., hash function 709 of FIG. 7, such that a hash value may be determined for packet 706.

In one embodiment, in addition to providing the contents of destination IP address field 812a and the contents of source IP address field 812b to a hash function, contents of a destination port field 812c and contents of a source port field 812d may also be provided to the hash function. The destination port and the source port identified in fields 812c and 812d, respectively, are generally the destination port and the source port of a protocol that is being carried in a body 816 of packet 706. The protocol indicates a transport type associated with packet 706, e.g., a Transmission Control Protocol (TCP) or a User Datagram Protocol (UDP). In an embodiment in which a single host runs different applications, and the destination IP address and the source IP address are the same for packet 706, a destination port and a source port may be provided to a hash function.

Figure 9:
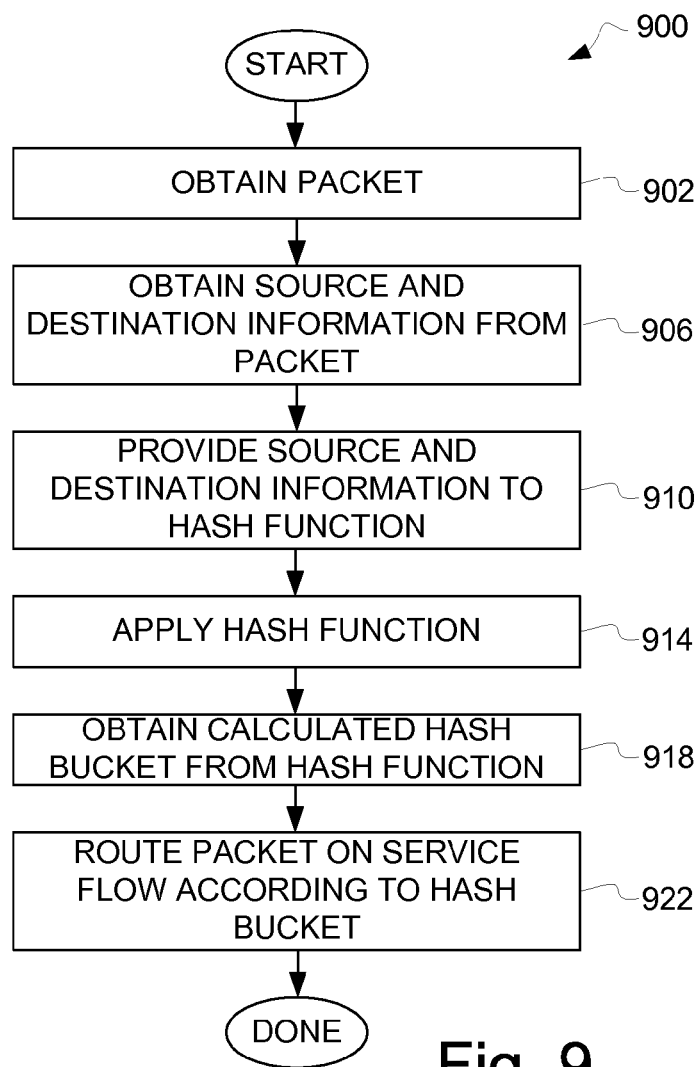
FIG. 9 is a process flow diagram which illustrates the steps associated with a per-session load sharing method which uses a hash function will be described in accordance with an embodiment of the present invention.

With reference to FIG. 9, one per-session load sharing method which uses a hash function will be described in accordance with an embodiment of the present invention. A process 900 begins at step 902 in which a packet that is to be transmitted is obtained, e.g., by a subscriber unit which executes computer readable program code devices. Once the packet is obtained, source and destination information is obtained from the packet in step 906. As described above, a source IP address and a destination IP address may be obtained. A source port and a destination port may also be obtained in addition to the source IP address and the destination IP address, although in one embodiment, the source port and the destination port may be obtained in lieu of the source IP address and the destination IP address.

The source and destination information is provided to the hash function in step 910, and the hash function is applied in step 914. The hash function, which may be implemented as computer program code devices and executed by a transmit driver of a subscriber unit, determines a hash bucket value which corresponds to the source and destination information. It should be appreciated that the hash function that is applied in step 914 may be substantially any suitable hash function.

One suitable hash function which is suitable for use when there are sixteen or fewer service flows and sixteen hash buckets is as follows:

hash=DST^(DST<<5)^(DST>>16)^(DST<<13);
hash^=(SRC<<3)^(SRC<<11);
hash=((((long)hash)*16)>>16);

where DST is a destination IP address and SRC is a source IP address.

In step 918, the calculated hash bucket value is obtained from the hash function. Once the hash value for the packet is obtained in step 918, the packet is routed or transmitted on the service flow that corresponds to the hash value. In other words, the packet is routed on the service flow which is assigned to a hash bucket that is appropriate for the hash bucket value. Once the packet is transmitted, process 900 is completed.

As discussed above, the number of hash buckets that are set up for use with a subscriber unit is generally dependent upon the number of available service flows or active paths. In one embodiment, there may be sixteen hash buckets and, hence, sixteen hash bucket values for any number of service flows. FIG. 10 is a table which indicates the associations between service flows and hash bucket values in accordance with an embodiment of the present invention. A table 1000, which may be maintained by a subscriber unit, includes entries 1004 relating to a total number of available service flows and entries relating to hash bucket values. As shown, when there is only one available service flow between a subscriber unit and a headend unit, packets which are associated with each of sixteen hash bucket values are all transmitted upstream via the only available service flow. When there are two service flows available, then packets which are associated with even hash bucket values may be transmitted via a first service flow and packets which are associated with odd hash bucket values may be transmitted via a second service flow. In other words, packets of one session may be transmitted via the first service flow and packets of a second session may be transmitted via the second service flow.

It should be appreciated that in lieu of including sixteen hash bucket values irregardless of the number of service flows, the number of hash bucket values may generally be greater than or equal to the number of service flows or ports. For example, when there are two service flows, a hashing function which generates only two possible hash values may be used such that one hash bucket value may be assigned to a first service flow and a second hash bucket value may be assigned to a second service flow.

In one embodiment of a per-session method of sharing traffic on multiple service flows, classifiers may be used in conjunction with a hashing function. By way of example, when a packet matches a known classifier, the packet may be sent on a service flow associated with the known classifier, and when the packet does not match a known classifier, a hashing function may be applied to the packet to identify an appropriate service flow. Using known classifiers, or classifiers which are set by a network administrator when a subscriber unit is put into use, in conjunction with a hashing function may reduce the overhead associated with distributing packets.

Figure 11:
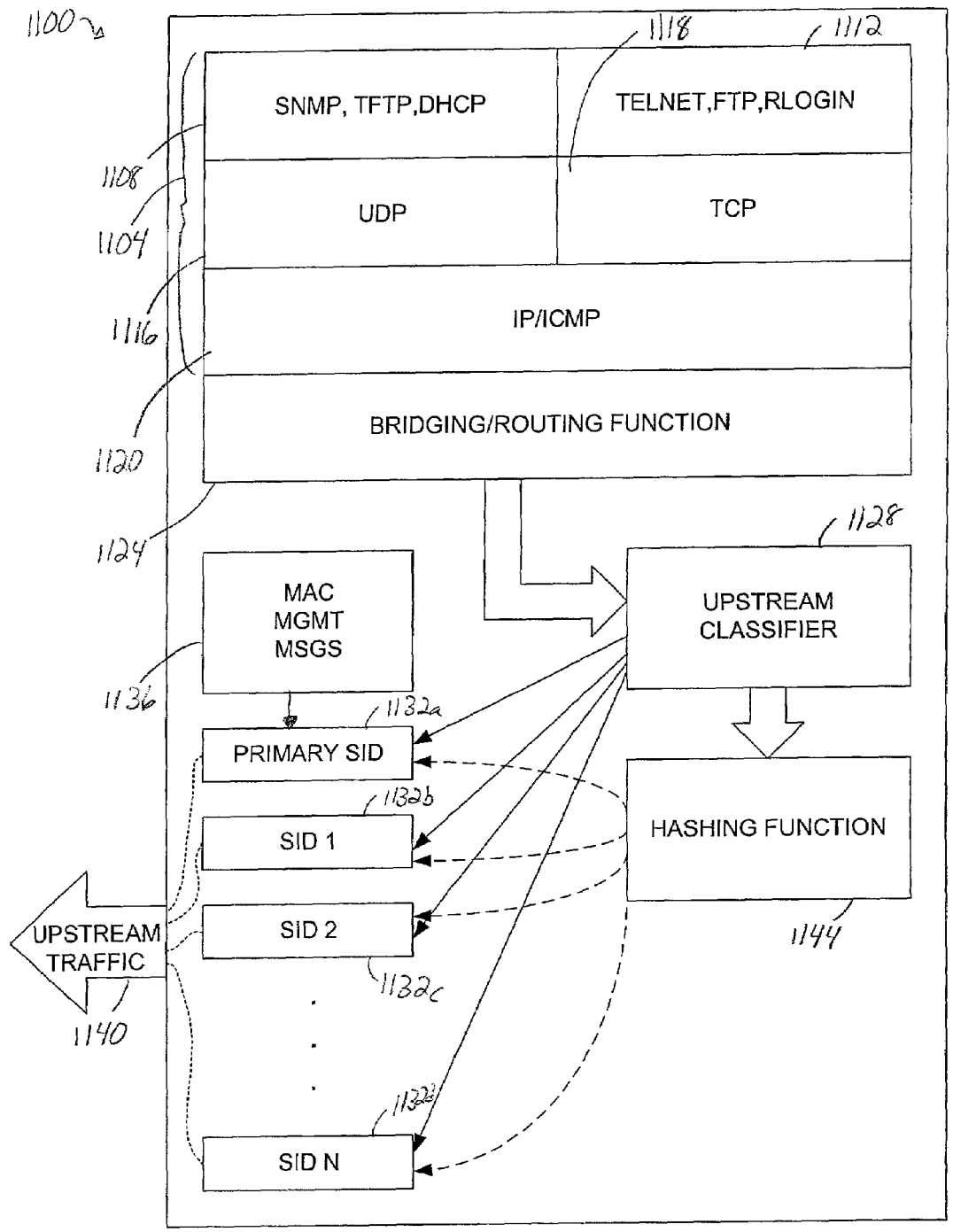
FIG. 11 is a diagrammatic representation of a subscriber unit or a cable modem which routes packets using both classifiers and a hashing function in accordance with an embodiment of the present invention.

FIG. 11 is a diagrammatic representation of a subscriber unit or a cable modem which routes packets using both classifiers and a hashing function in accordance with an embodiment of the present invention. A device 1100, which may be a subscriber unit or a cable modem, includes a protocol stack 1104 which includes a block 1108 associated with at least one of a Simple Network Management Protocol (SNMP), a Trivial File-Transfer Protocol (TFTP), and a Dynamic Host Configuration Protocol (DHCP). Stack 1104 also includes a block 1112 which enables telnet, File Transfer Protocol (FTP), and remote login (RLOGIN) functionality to be associated with device 1100.

A User Datagram Protocol (UDP) block 1116 and a Transmission Control Protocol (TCP) block 1118 are also included in stack 1104, as is a block 1120 which is associated with IP and an Internet Control Message Protocol (ICMP). A bridging or routing function block 1124 is arranged to receive packets, e.g., from a local area network or personal computer that is in communication with device 1100, and to pass the packets to an upstream classifier block 1128 which is arranged to determine if a packet matches a known classifier. If a packet matches a known classifier, then upstream classifier block 1128 may provide the packet to an appropriate service identifier (SID) 1132 for transmitting through an appropriate service flow. As shown, a Media Access Control (MAC) block 1136 may be in communication with SIDs 1132 to facilitate the transmission of packets as upstream traffic 1140.

If upstream classifier block 1128 fails to identify a known classifier for a packet, the packet, or information associated with the packet, may be provided to a hashing function block 1144 which includes logic that applies a hashing function to the information associated with the packet. The hash value generated for the packet using the hashing function may then be used to route the packet to an appropriate service flow via an appropriate SID 1132.

In general, it should be understood that device 1100 may not necessarily include upstream classifier block 1128, e.g., when no upstream classifiers are used. That is, bridging or routing function block 1124 may provide packets or information relating to packets substantially directly to hashing function block 1144.

Although only a few embodiments of the present invention have been described, it should be understood that the present invention may be embodied in many other specific forms without departing from the spirit or the scope of the present invention. By way of example, hash buckets may be allocated in substantially any way. If a service flow is to be assigned to more than one hash bucket, the hash buckets that are associated with the service flow may be assigned based upon substantially any suitable criterion. Typically, the hash buckets may be assigned based upon an anticipated traffic pattern such that traffic may be divided fairly evenly. Alternatively, the assignment of hash buckets to certain service flows may be random.

While a DOCSIS protocol has been described as being used in conjunction with the present invention, it should be appreciated that substantially any suitable protocol may be used in conjunction with the present invention. For example, wireless systems which are implemented with respect to specifications that are currently being developed by the Broadband Wireless Internet Forum (BWIF) may use per-packet load sharing or per-session load sharing methods.

In general, the steps associated with methods of load sharing in DOCSIS may be widely varied. Steps may be added, removed, altered, or reordered without departing from the spirit or the scope of the present invention. Therefore, the present examples are to be considered as illustrative and not restrictive, and the invention is not to be limited to the details given herein, but may be modified within the scope of the appended claims.

What is claimed is:

1. A method for forwarding a packet upstream from a subscriber unit to a central access point, the packet including destination information and source information, the method comprising:
   determining a first value associated with the packet, the first value being one of a predetermined set of limited values, wherein the first value is determined using the destination information and the source information including applying a hash function to the destination information and the source information and generating the first value using the hash function, wherein the first value is a hash value;
   identifying a first service flow that is suitable for use to forward the packet, the first service flow being one of a set of service flows between the source and the destination, wherein the first service flow is identified using the first value associated with the packet; and
   sending the packet on the first service flow.

2. The method of claim 1 wherein the first value is associated substantially only with the first service flow, and wherein substantially any packet which is associated with the first value is sent through the first service flow.

3. The method of claim 1 further including: assigning the first value to the first service flow.

4. The method of claim 1 wherein the destination information is a destination Internet Protocol (IP) address and the source information is a source IP address.

5. The method of claim 1 wherein the central access point is a headend.

6. The method of claim 5 wherein the subscriber unit and the headend are associated with a Data Over Cable Service Interface Specifications (DOCSIS) protocol.

7. The method of claim 1 wherein the subscriber unit is a cable modem and the central access point is a cable modem terminating system, and wherein the cable modem and the cable modem terminating system are associated with a DOCSIS protocol.

8. The method of claim 1 wherein the set of service flows includes up to approximately sixteen service flows.

9. The method of claim 1 wherein the packet is part of a session, the session including multiple packets, wherein each packet of the multiple packets is associated with the first value and is sent on the first service flow.

10. A method for forwarding packets associated with a session upstream from a subscriber unit to a central access point, the method comprising:
    identifying a number (N) of available service flows between the subscriber unit and the central access point;
    sending a first packet of the session from the subscriber unit to the central access point on a first service flow included in the N available service flows;
    sending an (N−1)th packet of the session from the subscriber unit to the central access point on an (N−1)th service flow included in the N available service flows;
    sending an Nth packet of the session from the subscriber unit to the central access point on an Nth service flow included in the N available service flows; and
    sending a second packet of the session from the subscriber unit to the central access point on a second service flow included in the N available service flows, wherein the second packet is substantially in sequence behind the first packet and before the (N−1)th packet and Nth packet.

11. The method of claim 10 further including:
    sending an (M*N+1)th packet of the session from the subscriber unit to the central access point on the first service flow, wherein M is a positive integer; and
    sending an (M*N)th packet of the session from the subscriber unit to the central access point on the Nth service flow.

12. The method of claim 10 wherein the central access point is a headend.

13. The method of claim 12 wherein the subscriber unit and the headend are associated with a Data Over Cable Service Interface Specifications (DOCSIS) protocol.

14. The method of claim 10 wherein the subscriber unit is a cable modem and the central access point is a cable modem terminating system, and wherein the cable modem and the cable modem terminating system are associated with a Data Over Cable Service Interface Specifications (DOCSIS) protocol.

15. A device for forwarding a packet upstream to a central access point, the packet including destination information and source information, the device comprising:
    means for causing a first value associated with the packet to be determined, the first value being one of a predetermined set of limited values, wherein the means for causing the first value to be determined include means for causing the destination information and the source information to be used, means for causing a hash function to be applied to the destination information and the source information; and means for causing the first value to be generated using the hash function, wherein the first value is a hash value;
    means for causing a first service flow that is suitable for use to forward the packet to be identified, the first service flow being one of a set of service flows between the source and the central access point, wherein the means for causing the first service flow to be identified include means for causing first service flow to be identified using the first value associated with the packet; and
    means for causing the packet to be sent on the first service flow.

16. The device of claim 15 wherein the first service flow is associated with the first value, wherein substantially any packet which is associated with the first value is sent through the first service flow.

17. The device of claim 15 wherein the device is one of a subscriber unit that supports a Data Over Cable Service Interface Specifications (DOCSIS) protocol and a cable modem that supports the DOCSIS protocol.

18. The device of claim 15 wherein the device is one of a subscriber unit and a cable modem.

19. A device for forwarding packets associated with a session upstream to a central access point, the device comprising:
    means for causing a number (N) of available service flows to the central access point to be identified;
    means for causing a first packet of the session to be sent to the central access point on a first service flow included in the N available service flows;
    means for causing an (N−1)th packet of the session to be sent to the central access point on an (N−1)th service flow;
    means for causing an Nth packet of the session to be sent to the central access point on an Nth service flow included in the N available service flows;
    means for causing a second packet of the session to be sent to the central access point on a second service flow, wherein the second packet is substantially in sequence behind the first packet and before the (N−1)th packet and Nth packet.

20. The device of claim 19 further including:
means for causing a (M*N+1)th packet of the session to be sent to the central access point on the first service flow, wherein M is a positive integer; and
means for causing sending an (M*N)th packet of the session to be sent to the central access point on the Nth service flow.

21. The device of claim 19 wherein the device is one of a subscriber unit that supports a Data Over Cable Service Interface Specifications (DOCSIS) protocol and a cable modem that supports the DOCSIS protocol.

22. The device of claim 19 wherein the device is one of a subscriber unit and a cable modem.

23. A device for forwarding packets to a central access point through a number of available service flows, the device comprising:
a routing component;
a hashing component, the hashing component being arranged to apply a hash function to information associated with a first packet to determine a value, wherein the routing component is arranged to provide the information associated with the first packet to the hashing component and the potential number of determined values at least equal to the number of available service flows; and
a first service flow identifier, the first service flow identifier being associated with the value, wherein the hashing component associates the first packet with the first service flow identifier.

24. The device of claim 23 wherein the service flow identifier is arranged to cause the packet to be forwarded on a service flow associated with the service flow identifier.

25. The device of claim 23 further including a second service flow identifier, wherein the second service flow identifier is associated with a different value and the hashing component is arranged to select the first service flow identifier using the value.

26. The device of claim 23 wherein the information includes destination information and source information associated with the packet.

27. The device of claim 23 wherein the device is one of a subscriber unit and a cable modem.

28. A device comprising:
a receiving component configured to receive a plurality of packets that are to be forwarded to a central access point by a Data Over Cable Service Interface Specifications (DOCSIS) protocol;
a plurality of service flow identifiers which are associated with a plurality of service flows of said DOCSIS protocol; and
a routing component configured to receive the plurality of packets from the receiving component and to provide the plurality of packets to the plurality of service flow identifiers of said DOCSIS protocol on a substantially round-robin basis, wherein the routing component is further configured to provide a first packet of the plurality of packets to a first service flow identifier of the plurality of service flow identifiers and to provide an Nth packet of the plurality of packets to an Nth service flow identifier of the plurality of service flow identifiers, and not to provide a second packet, that is received by the receiving component between the first packet and the Nth packet, to either the first service flow identifier or the Nth service flow identifier.

29. The device of claim 28 wherein the plurality of packets includes an (N+1)th packet and an (N+N)th packet, wherein the routing component is further configured to provide the (N+1)th packet to the first service flow identifier and the (N+N)th packet to the Nth service flow identifier.

30. The device of claim 28 wherein the device is one of a subscriber unit and a cable modem.

* * * * *

UNITED STATES PATENT AND TRADEMARK OFFICE
CERTIFICATE OF CORRECTION

PATENT NO.       : 7,602,716 B1                      Page 1 of 1
APPLICATION NO.  : 10/028069
DATED            : October 13, 2009
INVENTOR(S)      : Thippeswamy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2314 days.

Signed and Sealed this

Fifth Day of October, 2010

David J. Kappos
*Director of the United States Patent and Trademark Office*